Dec. 15, 1970  E. V. LAVON  3,547,561
COMPRESSOR VALVE DEVICES
Filed Dec. 3, 1968  2 Sheets-Sheet 1
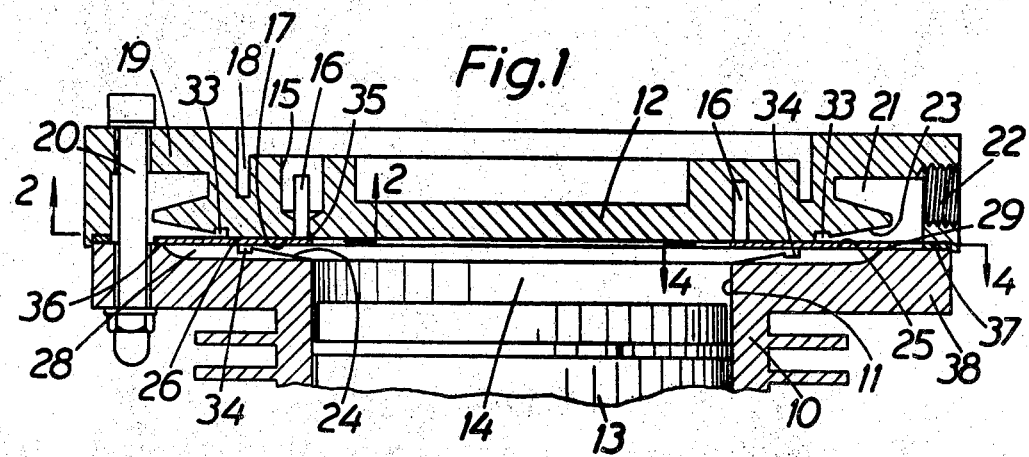
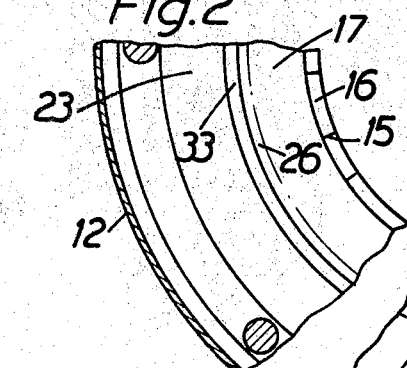
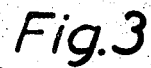
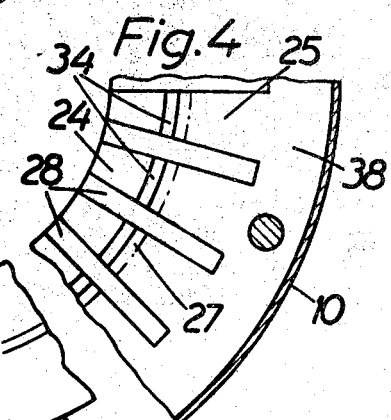
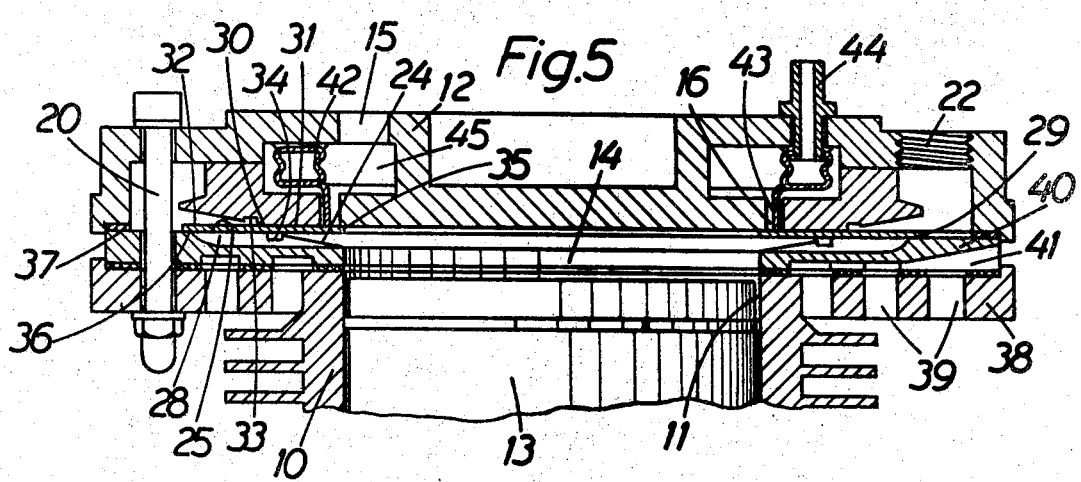
INVENTOR.
Eric Volmar Lavon
By Eric Y. Munson
Attorney

United States Patent Office 3,547,561
Patented Dec. 15, 1970

3,547,561
COMPRESSOR VALVE DEVICES
Erik Volmar Lavon, Nacka, Sweden, assignor to Atlas Copco Aktiebolag, Nacka, Sweden, a corporation of Sweden
Filed Dec. 3, 1968, Ser. No. 780,710
Int. Cl. F04b *39/10;* F16k *17/00*
U.S. Cl. 417—488                                     17 Claims

ABSTRACT OF THE DISCLOSURE

A compressor has a valve device for controlling flow of fluid into and from the working chamber of the compressor, said valve device comprising a thin annular disk having a first annular portion forming an inlet valve, a second annular portion forming an outlet valve, and an annular intermediate portion which separates said first and second annular portions. The intermedate portion of the valve disk is fixed in the casing. The valve disk is resilient and bends under the pressure of the working fluid to open inlet and outlet ports, respectively, for the working fluid.

---

One object of the invention is to provide a compressor valve device which permits compressor operation at high numbers of revolutions. A second object of the invention is to provide a compressor valve device which is of simple design and takes little space. A still further object of the invention is to provide an automatic compressor valve device which is particularly suitable for reciprocating compressors. A still further object of the invention is to provide a valve device for a compressor which permits the use of a very small clearance space in the compressor. A still further object of the invention is to provide a compressor with a valve device which is so designed that deposits of coke or other inpurities in the valve are unlikely to happen and if they happen do not spoil the tightness of the compressor or the operation of the valve device. A further object is to make possible the use of aluminum or aluminum alloys for valve guides and seats.

In earlier designs single or multiple ring disk automatic compressor valves have been used or suggested which, however, do not permit such high reciprocating compressor speeds as 3–6000 revolutions per minute, which are desirable to meet the competition of rotary compressors and for other purposes. Valve failures have also been frequent in conventional reciprocating compressors when attempts have been made to increase the speed and/or the compression ratio of each compression stage in a reciprocating compressor. The invention makes possible to raise the speed and/or compression ratio over present standard.

For the above and other purposes I provide a compressor having a casing, a first member in said casing, a second member in the casing, at least one of said members being movable relative to said other member, a working chamber in the casing between said members, inlet and outlet passages for a working chamber in the casing between said members, inlet and outlet passages for a working fluid communicable with said working chamber, a valve device for controlling the flow of fluid into and from the working chamber through said passages, said valve device comprising a thin annular disk which under the influence of the pressure in the working chamber and the passages bends resiliently and which has a first annular portion forming an inlet valve, a second annular portion forming an outlet valve, and an annular intermediate portion, which separates said first and second annular portions, an annular portion in said casing with which said intermediate portion is constantly in sealing contact, and openings in said passages which in closed position of said valve disk are covered by the valve disk and in open position form communications between the respective passages and the working chamber.

Figure 6:
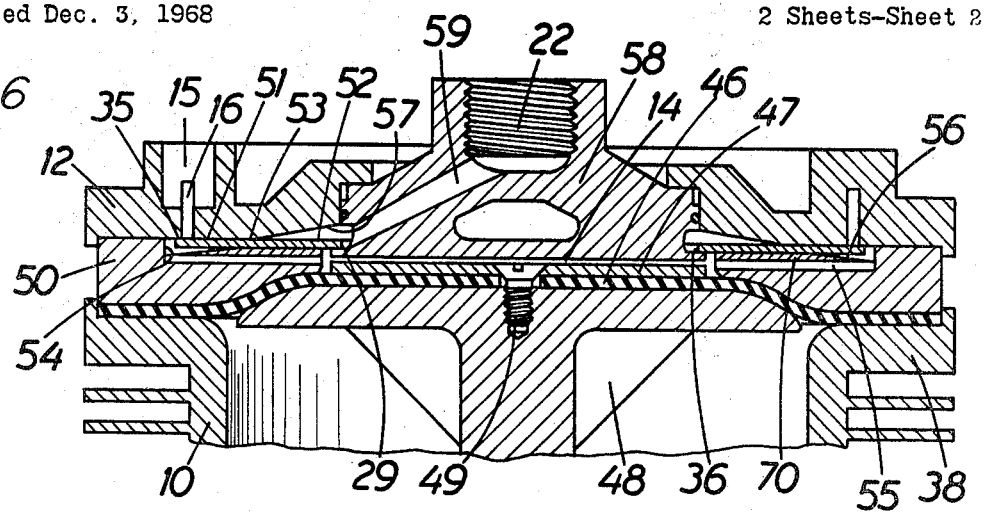
Figure 7:
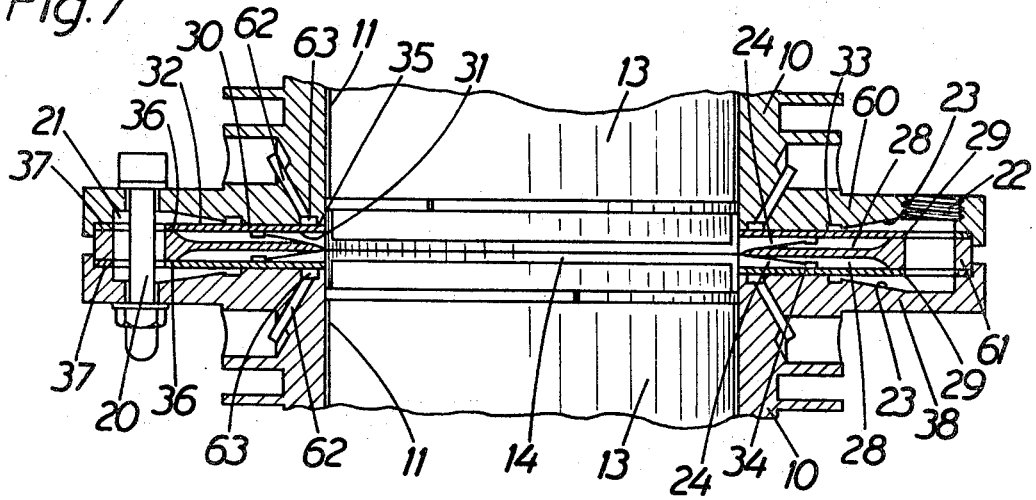
Figure 8:
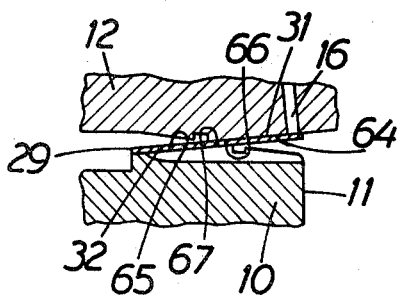
Figure 9:
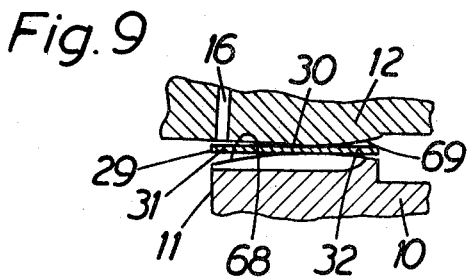

In the accompanying drawings three embodiments of compressors according to the invention and some modifications of said embodiments are illustrated by way of example. In the drawings FIG. 1 is an axial section and partial side elevation of the top portion of a cylinder and piston of a reciprocating compressor, FIG. 2 is a fragmentary view of the cylinder cover looking in axial direction on lines 2—2 in FIG. 1. FIG. 3 is a fragmentary view of the valve disk in FIG. 1, and FIG. 4 is a fragmentary view looking axially in FIG. 1 on lines 4—4 in FIG. 1. FIG. 5 is an axial section and partial side elevation of the top portion of a cylinder and piston of a reciprocating compressor according to a modification of the embodiment in FIG. 1. FIG. 6 is an axial section of the top portion of a cylinder of a reciprocating membrane compressor with a valve device according to the invention. FIG. 7 is an axial section and partial side elevation of the central portion of an opposed motion piston compressor with a valve device according to the invention. FIG. 8 is a detail axial section of a modification of the valve device portion of a compressor similar to FIG. 1. FIG. 9 is a similar detail axial section as FIG. 8 of a further modification of the valve device for a compressor similar to the embodiment in FIG. 1.

The illustrated compressors are of the reciprocating type having a reciprocating piston or membrane which may be reciprocated by any suitable device such as a crank mechanism, a cam mechanism, an eccentric, a combustion gas actuated piston, a hydraulic motor, a solenoid or other electrical device, as is well known in the art. The manner in which the reciprocating piston in the compressor construction according to the invention is driven does not form a part of the invention and is therefore not described and illustrated. The compressor according to the invention consists of a casing, which in the embodiment of FIG. 1 comprises a cylinder member 10 having a cylindrical bore 11 the end of which is covered by a member 12 forming a cylinder cover. The cylinder member and cover can be made of any suitable material, for instance aluminum or aluminum alloy or cast iron. A second member such as a reciprocating piston 13 is movable in the bore 11 and forms together with the bore and the cylinder cover 12 a working chamber 14 in which air or gas is compressed through the action of the piston 13. A number of small bores or bore holes 15 are provided in annular arrangement in the cover 12 and are united by an annular groove 16 and form together with said groove the inlet passages to the working chamber 14 for the working fluid, such as air. The groove 16 opens into an annular surface 17 on the underside of the cylinder cover 12 which annular surface forms a valve seat for an inlet valve. The cover 12 has an annular groove 18, which projects deep into the material of the cover and surrounds the bore holes 15 and forms a barrier for heat flow from the external portion 19 of the cylinder cover towards the central portion of the cylinder cover in which the inlet passages are provided. The portion 19 is bolted to a flange 38 at the upper end of the cylinder member 10 by a number of bolts 20. An annular duct 21 is provided in the portion 19 from which a delivery conduit (not shown) may be connected at 22. At the underside of the portion 19 a slightly conical annular surface is provided which forms a valve guide 23 for an outlet valve. The top of the cylinder member 10 has a slightly conical annular surface adjacent the cylinder bore 11 which surface forms a valve guide 24 for an inlet valve and an outer annular surface 25 which forms a valve seat for an outlet valve. The surfaces 17 and 23 on the cylinder cover are separated by a continuous annular surface 26 and the surfaces 24 and 25 are similarly separated by an annular surface 27. The surfaces 24, 25 and 27 are interrupted by radial grooves 28.

A thin annular disk valve member 29 is held in fixed position between the annular surfaces 26, and 27 on the cylinder cover and the cylinder member. An annular intermediate portion 30 of the disk valve member is held between the surfaces 26 and 27 and separates the member 29 in an inner annular portion 31 which forms the inlet valve and an outer annular portion 32 which forms the outlet valve. The annular sheet metal disk 29 may preferably be a steel disk with a thickness between 0.1 and 0.2 millimeter which is resilient and bends under the action of fluid pressure on the respective portions 31, 32 so that said portions move from the valve seats 17 and 25, respectively, towards the valve guides 24 and 23, respectively, under the fluid pressures produced in connection with the operation of the compressor.

A narrow annular groove 33 is provided just outside the annular portion 26 in the cylinder cover and a similar narrow annular groove 34 is provided in the cylinder member just inside the annular portion 27. These annular grooves are important for keeping the valve member and the valve guides free from deposits which might disturb the operation of the valve device.

The valve device operates so that upon suction in the chamber 14 produced by downward movement of the piston 13 in FIG. 1 the inlet portion 31 of the valve member 29 bends resiliently away from the seat 17 towards the valve guide 24 and admits air or gas through the passages formed by the bores 15 and the groove 16. At the upward stroke of the piston 13 the inlet valve portion 31 closes the inlet openings since the inlet valve portion 31 overlaps the groove 16 and forms a seal with the cylinder cover along a narrow annular surface 35 on the valve member. When the pressure in the working chamber 14 has reached a certain value the outlet valve portion 32 opens and the compressed fluid escapes through the radial grooves 28 to the annular duct 21 and the delivery conduit connected at 22. The outlet valve normally forms a seal with the top of the cylinder member 10 along an annular surface 36 on the valve member. The radial grooves 28 and the space between the conical surface 24 and the inlet valve portion 31 form the clearance space of the compressor together with a small clearance between the top of the piston 13 and the cover 12. According to the invention it is therefore possible to design a compressor with a very small clearance space and it is also possible to compress fluid such as air to 10–18 atmospheres above atmospheric pressure in a single compression stage. A thin sheet metal ring or packing 37 is provided between the top of the cylinder member 10 and the cylinder cover 12 outside the bolts 20, said ring having the same thickness as the valve member 29.

The illustrated valve device has proved very efficient under long operation tests and permits operation of a compressor with considerably higher speeds than has been practical so far in connection with reciprocating compressors, and the valve device has functioned satisfactorily at three thousand and six thousand numbers of revolutions of the compressor. Simultaneously the volumetric efficiency of the compressor has been rather high.

FIG. 5 illustrates a modification of the embodiment illustrated in FIGS. 1–4. The parts of the compressor in FIG. 5 are equivalent to corresponding parts in the compressor in FIG. 1 are designated with the same reference numerals and are not described again. In the embodiment of FIG. 5 the cylinder member 10 has a radial flange 38 which is provided with a number of openings 39 for cooling air. The valve guide 24 and the valve seat 25 are in this case formed on a separate disk member 40 in which the grooves 28 are formed, and said member 40 has at the underside, which rests against the top of the flange 38, a number of grooves or passages 41 which communicate with the openings 39 to permit cooling air to flow along the underside of the disk member 40 to cool said member and the fluid delivered by the compressor.

In the embodiment of FIG. 5 is also illustrated a membrane bellow 42 which has fingers or an annular ring 43 which extends into the groove 16 towards the inlet valve portion 31. The membrane bellow 42 is connected through tubing 44 to a pressure fluid conduit which may be supplied with pressure fluid under control of an unloading valve. When pressure fluid is admitted through the tubing 44 to the membrane 42 the fingers or ring 43 pushes the inlet valve portion 31 downwards towards the valve guide and keeps the valve open so that the compressor is unloaded. The membrane bellow 42 is provided in an annular space 45 in the cylinder cover 12 and fixed to the roof of space 45. The valve member 29 is the same as in FIG. 1.

In the embodiment of FIG. 6 the compressor piston consists of a diaphragm of rubber or other suitable material 46 said diaphragm being held between a disk 47 and a mushroom type piston top 48 fitted together by a screw 49. The diaphragm 46 is furthermore fixed between a disk member 50 and the annular flange 38 on the cylinder member 10. The disk 50 and the diaphragm 46 are held between the cylinder cover 12 and the flange 38 by bolts 20 (not illustrated in FIG. 6). In this embodiment the bores 15 and the groove 16 are provided close to the outer edge of the cylinder cover 12 and the disk valve 29 is provided with an inlet portion 51 and an outlet portion 52, the inlet portion being the outer portion of the valve disk which, similarly as in FIG. 1, has an intermediate portion 53 which is held fixed between the cylinder cover 12 and a ring plate 70 fitted in a recess 54 in the disk member 50. The ring plate 70 has a number of radial grooves 55 at the under side which before they reach the outer border line of the plate 70 intersect the slightly conical surface 56 which forms a valve guide for the inlet valve portion 51. When the inlet valve portion 51 is open a passage is consequently formed from the bores 15, through groove 16, outer portion of recess 54, and grooves 55 to the working chamber 14. The cover 12 has a slightly conical surface 57 which forms a valve guide for the outlet valve portion 52. The valve seat of the inlet valve portion 51 is formed by the cylinder cover 12 and the valve seat for the outlet valve portion 52 is formed on the ring plate 70. The sealing surfaces of the valve disk for the inlet valve portion are at 35 and for the outlet valve portion at 36. A separate central body 58 is fixed to the cylinder cover 12 and provides outlet passages 59 communicating with the delivery conduit at 22.

FIG. 7 illustrates a third embodiment of the invention as employed in connection with an opposed motion piston compressor. This compressor has two cylinder members 10, 10 and two pistons 13, 13 reciprocable in opposed motion in the bores 11 of the cylinder members 10. The cylinder members are provided with radial flanges 38 and 60 which are held together by bolts 20. Between the flanges 38 and 60 is fitted a disk 61 which has provided in the upper and lower faces grooves 28 similar to those ilustrated in the flange 38 in FIG. 4 which normally communicates with the working chamber 14 between the pistons 13. Two annular disk valves 29 are fitted between the disk 61 and the flanges 38 and 60. A number of inlet passages 62 in the cylinder member 10 communicate with an annular groove 63 in the cylinder members which in closed position of the disk valve 29 are covered by said valve. The design according to FIG. 7 provides a compressor with a very small clearance space in relation to the swept volume of the compressor.

FIG. 8 is a fractional view and illustrates a modification of the valve device according to FIG. 1. In FIG. 8 the valve member 29 is held between annular surfaces 66 and 67 which are slightly conical so that the valve receives an initial deformation into a slightly conical shape and in closed position rests on the slightly conical surfaces 64 and 65, respectively, which form the seats for the inlet valve portion 31 and the outlet valve portion 32 of the annular disk valve member 29. The conical surfaces 66 and 67 correspond to the annular surfaces 26 and 27 in FIG. 1. The inlet and outlet portions 31 and 32 are separated by an intermediate portion 30 in the same way as in FIG. 1 which intermediate portion 30 is held fixed between the conical surfaces 66 and 67 and forms a seal with 66.

The modification of the valve device illustrated in FIG. 9 differs from the embodiment in FIG. 1 only so far as the valve guides 68 and 69 for the inlet valve portion 31 and the outlet valve portion 32 are formed as convexly curved surfaces over which the valve member is bent.

The embodiments of the invention and the modifications above described and illustrated in the drawings should only be considered as examples and may be modified in several different ways within the following claims.

What I claim is:

1. A compressor having a casing, a first member in said casing, a second member in the casing, at least one of said members being movable relative to said other member, a working chamber in the casing between said members, inlet and outlet passages for a working fluid communicable with said working chamber, a valve device for controlling the flow of fluid into and from the working chamber through said passages, said valve device comprising a thin annular disc which under the influence of the pressures in the working chamber and the passages bends resiliently and which has a first annular portion forming an inlet valve, and a second annular portion forming an outlet valve, and an annular intermediate portion, which separates said first and second annular portions, an annular portion of said casing with which said intermediate portion is constantly in sealing contact and openings in said passages which in closed position of said valve disc are covered by the valve disc and in open position form communications between the respective passages and the working chamber.

2. A compressor according to claim 1, in which the first annular portion of the annular valve disc is situated between the inner border of said disc and the intermediate portion and forms said inlet valve, and the second annular portion is situated between the outer border of the disc and the intermediate portion and forms said outer valve.

3. The compressor according to claim 1, in which the first annular portion of the annular valve disc is situated between the outer border of the said disc and the intermediate portion and forms said inlet valve, and the second annular portion is situated between the inner border of the disc and the intermediate portion and forms said outlet valve.

4. A compressor according to claim 1, in which the inlet passages are arranged in a ring in the casing and have an opening controlled by said first annuluar portion, said passages communicating with said working chamber through said opening in open position of the valve.

5. A compressor according to claim 1, in which the outlet passages comprise radial grooves in the casing extending from the working chamber, said grooves in open position of the second annular portion of the annular valve disc communicating with an annular duct connected with a pressure conduit from the compressor.

6. A compressor according to claim 1, in which said first member is a cylinder cover and said second member is a piston and a cylindrical wall is formed in the casing and the working chamber is formed between said cover, said piston and said wall, and in which said annular valve is a thin sheet metal disc disposed at the periphery of said cylinder wall, and an annular groove being provided in the cylinder cover radially outside of said inlet passages, said outlet passages being disposed radially outside of said groove and said groove provided a substantial heat insulation of a portion of the compressor in which the inlet passages are provided from a portion in which the outlet passages are provided.

7. A compressor according to claim 1, in which said first member is a first piston and said second member is a second piston, and a cylinder having a cylindrical wall is formed in the casing, said pistons being movable in opposed reciprocation in said cylinder, and said annular valve is a thin sheet metal disc disposed at the periphery of said cylindrical wall.

8. An opposed motion piston compressor according to claim 7, in which two annular disc valves are provided at the periphery of the cylindrical wall, said outlet passages being provided between said valves.

9. A compressor according to claim 1, in which said movable member is a diaphragm.

10. A compressor according to claim 1, in which said annular valve disc is a sheet metal disc with a thickness between 0.1 and 0.2 millimetre.

11. A compressor according to claim 1, in which an annular valve seat disc is provided for the disc valve, said outlet passages being formed as radial grooves in one face of said valve seat disc whereas cooling fluid passages are provided at the opposite side of said valve seat disc.

12. A compressor according to claim 1, in which the valve disc is an annular sheet metal disc cooperating with an annular valve guide having an annular groove extending along the border of said intermediate annular portion.

13. A compressor according to claim 12, in which said outlet passages are formed as radial grooves separated by radial ridges in which said annular groove is provided.

14. A compressor according to claim 1, in which the valve disc is a flat annular sheet metal disc, a valve guide for the inlet valve portion being a slightly conical surface having a number of radial grooves extending to below the outlet valve portion and ending at a distance inside the border of the outlet valve portion and separated by ridges forming the valve guide for the inlet valve postion inside the intermediate portion and an outlet valve seat outside the intermediate portion, a valve guide for the outlet valve portion being formed as a slightly conical surface outside the intermediate portion.

15. A compressor according to claim 1, in the valve is a sheet metal disc valve in which the intermediate valve portion is held between a slightly conical annular surface and similarly annularly disposed ridge portions and that the disc valve member is resiliently pressed against a conic inlet valve seat and a conical valve seat.

16. A compressor according to claim 1, in which an annular valve seat is provided which is gradually curved from a portion on which the intermediate valve disc portion rests.

17. A compressor according to claim 1, in which the valve is a sheet metal disc which resiliently press fitted so that it is pressed against a seat with a prestress.

References Cited

UNITED STATES PATENTS

| | | | |
|---|---|---|---|
| 1,416,771 | 5/1922 | Babson et al. | 137—512.4 |
| 2,757,615 | 8/1956 | Bolles et al. | 230—231X |

ROBERT M. WALKER, Primary Examiner

U.S. Cl. X.R.

137—512.4; 417—446, 560